United States Patent
Yi et al.

(10) Patent No.: US 11,232,318 B2
(45) Date of Patent: Jan. 25, 2022

(54) METHODS AND APPARATUSES FOR VEHICLE APPEARANCE FEATURE RECOGNITION, METHODS AND APPARATUSES FOR VEHICLE RETRIEVAL, STORAGE MEDIUM, AND ELECTRONIC DEVICES

(71) Applicant: BEIJING SENSETIME TECHNOLOGY DEVELOPMENT CO., LTD., Beijing (CN)

(72) Inventors: Shuai Yi, Beijing (CN); Chongdao Wang, Beijing (CN); Luming Tang, Beijing (CN); Junjie Yan, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 91 days.

(21) Appl. No.: 16/678,870

(22) Filed: Nov. 8, 2019

(65) Prior Publication Data
US 2020/0074205 A1     Mar. 5, 2020

Related U.S. Application Data

(63) Continuation of application No. PCT/CN2018/093165, filed on Jun. 27, 2018.

(30) Foreign Application Priority Data

Jun. 28, 2017   (CN) .......................... 201710507778.5

(51) Int. Cl.
G06K 9/00     (2006.01)
G06K 9/32     (2006.01)
G06K 9/46     (2006.01)

(52) U.S. Cl.
CPC ........... *G06K 9/325* (2013.01); *G06K 9/4604* (2013.01); *G06K 2209/23* (2013.01)

(58) Field of Classification Search
CPC ... G06K 9/325; G06K 9/4604; G06K 2209/23
See application file for complete search history.

(56) References Cited

U.S. PATENT DOCUMENTS

2018/0060684 A1* 3/2018 Ma ........................ G06K 9/6215
2018/0081908 A1* 3/2018 Matsubara .............. G06T 7/248
2018/0174046 A1* 6/2018 Xiao .................. G06K 9/00362

FOREIGN PATENT DOCUMENTS

CN      105160333 A     12/2015
CN      106023220 A   * 10/2016
(Continued)

OTHER PUBLICATIONS

Chen et al Vehicle Type Recognition based on Multi-branch and multi-layer Features, 2017 IEEE 2nd Advanced Information Technology, Electronic and Automation Control Conference (IAEAC), Mar. 25-26, 2017, p. 2038-2041 (Year: 2017).*

(Continued)

*Primary Examiner* — Ping Y Hsieh
*Assistant Examiner* — Xiao Liu
(74) *Attorney, Agent, or Firm* — Pattao, LLC; Junjie Feng

(57) ABSTRACT

The method for vehicle appearance feature recognition includes: multiple region segmentation results of a target vehicle are obtained from an image to be recognized; global feature data and multiple pieces of region feature data are extracted from the image to be recognized based on the multiple region segmentation results; and the global feature data and the multiple pieces of region feature data are fused to obtain appearance feature data of the target vehicle.

19 Claims, 15 Drawing Sheets

Multiple region segmentation results of a target vehicle are obtained from an image to be recognized — S101

Global feature data and multiple pieces of regional feature data are extracted from the image to be recognized based on the multiple region segmentation results — S102

The global feature data and the multiple pieces of regional feature data are fused to obtain appearance feature data of the target vehicle — S103

(56) References Cited

FOREIGN PATENT DOCUMENTS

| CN | 106023220 A | 10/2016 |
|----|-------------|---------|
| CN | 106384100 A | 2/2017  |
| CN | 106778867 A | 5/2017  |
| JP | 2017062781 A | 3/2017 |

OTHER PUBLICATIONS

International Search Report in the international application No. PCT/CN2018/093165, dated Sep. 29, 2018.
English translation of the Written Opinion of the International Search Authority in the international application No. PCT/CN2018/093165, dated Sep. 29, 2018.
First Office Action of the Chinese application No. 201710507778.5, dated Apr. 3, 2019.
Second Office Action of the Chinese application No. 201710507778.5, dated Sep. 19, 2019.
Zhongdao Wang, Luming Tang et al., Orientation Invariant Feature Embedding and Spatial Temporal Regularization for Vehicle Re-identification.
Jie Fang, et al., Fine-Grained Vehicle Model Recognition Using a Coarse-to-Fine Convolutional Neural Network Architecture, IEEE Transactions on Intelligent Transportation Systems, Nov. 15, 2016, vol. 18, No. 7, URL, https://ieeexplore.ieee.org/document/7744550.
Rogerio Schmidt Feris, et al., Large-Scale Vehicle Detection, Indexing, and Search in Urban Surveillance Videos, IEEE Transactions on Multimedia, Oct. 6, 2011, vol. 14, No. 1, URL, https://ieeexplore.ieee.org/document/6035786.
Chaocun Chen, et al., Vehicle type recognition based on multi-branch and multi-layer features, IEEE 2nd Advanced Information Technology, Electronic and Automation Control Conference (IAEAC), Mar. 26, 2017, URL, https://ieeexplore.ieee.org/document/8054374.
First Office Action of the Japanese application No. 2019-562381, dated Jan. 12, 2021.

* cited by examiner

METHODS AND APPARATUSES FOR VEHICLE APPEARANCE FEATURE RECOGNITION, METHODS AND APPARATUSES FOR VEHICLE RETRIEVAL, STORAGE MEDIUM, AND ELECTRONIC DEVICES

CROSS-REFERENCE TO RELATED APPLICATIONS

The present application is a continuation of International Application No. PCT/CN2018/093165 filed on Jun. 27, 2018, which claims priority to Chinese Patent Application No. 201710507778.5 filed on Jun. 28, 2017. The disclosures of these applications are hereby incorporated by reference in their entirety.

BACKGROUND

A vehicle retrieval task refers to providing a vehicle image to be queried, and retrieving all images of vehicles in the vehicle image in a large-scale vehicle image database.

SUMMARY

Embodiments of the present disclosure relate to the artificial intelligence technologies, and in particular to methods and apparatuses for vehicle appearance feature recognition, storage medium, and electronic devices, as well as methods and apparatuses for vehicle retrieval, storage medium, and electronic devices.

An objective of embodiments of the present disclosure is to provide technical solutions for vehicle appearance feature recognition and technical solutions for vehicle retrieval.

According to a first aspect of the embodiments of the present disclosure, a method for vehicle appearance feature recognition is provided, including: obtaining multiple region segmentation results of a target vehicle from an image to be recognized; extracting global feature data and multiple pieces of region feature data from the image to be recognized based on the multiple region segmentation results; and fusing the global feature data and the multiple pieces of region feature data to obtain appearance feature data of the target vehicle.

According to a second aspect of the embodiments of the present disclosure, a method for vehicle retrieval is provided. The method includes: obtaining appearance feature data of a target vehicle in an image to be retrieved by means of the method according to the first aspect of the embodiments of the present disclosure; and searching a candidate vehicle image library for a target candidate vehicle image matching the appearance feature data.

According to a third aspect of the embodiments of the present disclosure, an apparatus for vehicle appearance feature recognition is provided. The apparatus includes: a first obtaining module, configured to obtain multiple region segmentation results of a target vehicle from an image to be recognized; an extraction module, configured to extract global feature data and multiple pieces of region feature data from the image to be recognized based on the multiple region segmentation results; and a fusion module, configured to fuse the global feature data and the multiple pieces of region feature data to obtain appearance feature data of the target vehicle.

According to a fourth aspect of the embodiments of the present disclosure, an apparatus for vehicle retrieval is provided. The apparatus includes: a second obtaining module, configured to obtain appearance feature data of a target vehicle in an image to be retrieved by means of the apparatus according to the third aspect of the embodiments of the present disclosure; and a searching module, configured to search a candidate vehicle image library for a target candidate vehicle image matching the appearance feature data.

According to a fifth aspect of the embodiments of the present disclosure, provided is a computer readable storage medium having stored thereon computer program instructions that, when executed by a processor, cause steps of the method for vehicle appearance feature recognition according to the first aspect of the embodiments of the present disclosure to be implemented.

According to a sixth aspect of the embodiments of the present disclosure, provided is a computer readable storage medium having stored thereon computer program instructions that, when executed by a processor, cause steps of the method for vehicle retrieval according to the second aspect of the embodiments of the present disclosure to be implemented.

According to a seventh aspect of the embodiments of the present disclosure, provided is an electronic device, including a first processor, a first memory, a first communication element, and a first communication bus, wherein the first processor, the first memory, and the first communication element are in communication with each other by means of the first communication bus; and the first memory is configured to store at least one executable instruction which enables the first processor to execute the steps of the method for vehicle appearance feature recognition according to the first aspect of the embodiments of the present disclosure.

According to an eighth aspect of the embodiments of the present disclosure, provided is an electronic device, including a second processor, a second memory, a second communication element, and a second communication bus, wherein the second processor, the second memory, and the second communication element are in communication with each other by means of the second communication bus; and the second memory is configured to store at least one executable instruction which enables the second processor to execute the steps of the method for vehicle retrieval according to the second aspect of the embodiments of the present disclosure.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
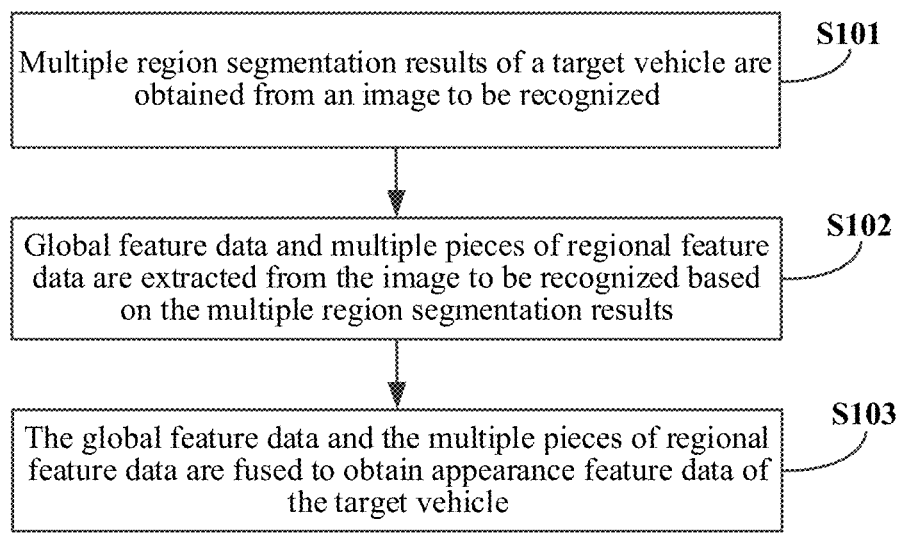
FIG. 1 is a flowchart of one embodiment of a method for vehicle appearance feature recognition according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the disclosures or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like, to perform specific tasks or implement specific abstract data categories. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of one embodiment of a method for vehicle appearance feature recognition according to the present disclosure.

Referring to FIG. 1, at step S101, multiple region segmentation results of a target vehicle are obtained from an image to be recognized.

In some embodiments, in terms of the contents included in the image, the image to be recognized may be an image including a part of the target vehicle or an image including the whole target vehicle, etc. In terms of the category of the image, the image to be recognized may be a photographed static image, or a video image in a video frame sequence, and may also be a synthetic image, etc. Multiple region segmentation results respectively correspond to regions of different orientations of the target vehicle. According to one or more embodiments of the present disclosure, the multiple region segmentation results may include, but not limited to, segmentation results of a front side, a rear side, a left side, and a right side of the target vehicle. Certainly, in some embodiments of the present disclosure, the multiple region segmentation results are not limited to the segmentation results of four regions including the front side, the rear side, the left side, and the right side of the target vehicle. For example, the multiple region segmentation results may further include segmentation results of six regions including the front side, the rear side, the left side, the right side, the top, and the bottom of the target vehicle, and the multiple region segmentation results may further include the segmentation results of eight regions including the front side, the rear side, the left side, the right side, the left front, the right front, the left rear, and the right rear. The region segmentation result is a single-channel weight map, and the size of the value in the region segmentation result indicates the importance degree of the corresponding position in the image to be recognized, that is, the larger the value in the region segmentation result is, the higher the degree of importance of the corresponding position in the image to be recognized is. The smaller the value in the region segmentation result is, the lower the degree of importance of the corresponding position in the image to be recognized is.

In one embodiment, step S101 may be performed by a processor by invoking a corresponding instruction stored in a memory, and may also be performed by a first obtaining module 501 run by the processor.

At step S102, global feature data and multiple pieces of region feature data are extracted from the image to be recognized based on the multiple region segmentation results.

The global feature data and the multiple pieces of region feature data are global feature data and multiple pieces of region feature data of the target vehicle. The global feature data is a vector-represented global feature, and the region feature data is a vector-represented region feature.

In one embodiment, step S102 may be performed by a processor by invoking a corresponding instruction stored in a memory, and may also be performed by an extraction module 502 run by the processor.

At step S103, the global feature data and the multiple pieces of region feature data are fused to obtain appearance feature data of the target vehicle.

In the case where both the global feature data and the region feature data are represented by vectors, the dimension of the global feature vector is the same as the dimension of the region feature vector. The appearance feature data of the target vehicle includes features of multiple local regions of the target vehicle and features of a global region of the target vehicle.

In one embodiment step S103 may be performed by a processor by invoking a corresponding instruction stored in a memory, and may also be performed by a fusion module 503 run by the processor.

According to the method for vehicle appearance feature recognition in the embodiment, multiple region segmentation results of a target vehicle are obtained from an image to be recognized, then global feature data and multiple pieces of region feature data are extracted from the image to be recognized based on the multiple region segmentation results, and the global feature data and the multiple pieces of region feature data are fused to obtain appearance feature data of the target vehicle. Compared with the method for obtaining vehicle appearance features in the prior art, the method for vehicle appearance feature recognition in the embodiments recognizes the vehicle appearance features such as the global features, and features of local regions of the vehicle appearance, and reflects detail information of the target vehicle by means of the local region features, so as to describe the appearance of the vehicle more accurately. In addition, by means of the vehicle appearance features recognized in the embodiments, the vehicle appearance features in different vehicle images may be compared directly, thereby solving the problem that different regions between different vehicle images cannot be compared.

The method for vehicle appearance feature recognition in the embodiments may be executed by any appropriate device having data processing capability, including, but not limited to, a terminal device, a server and the like.

Figure 2:
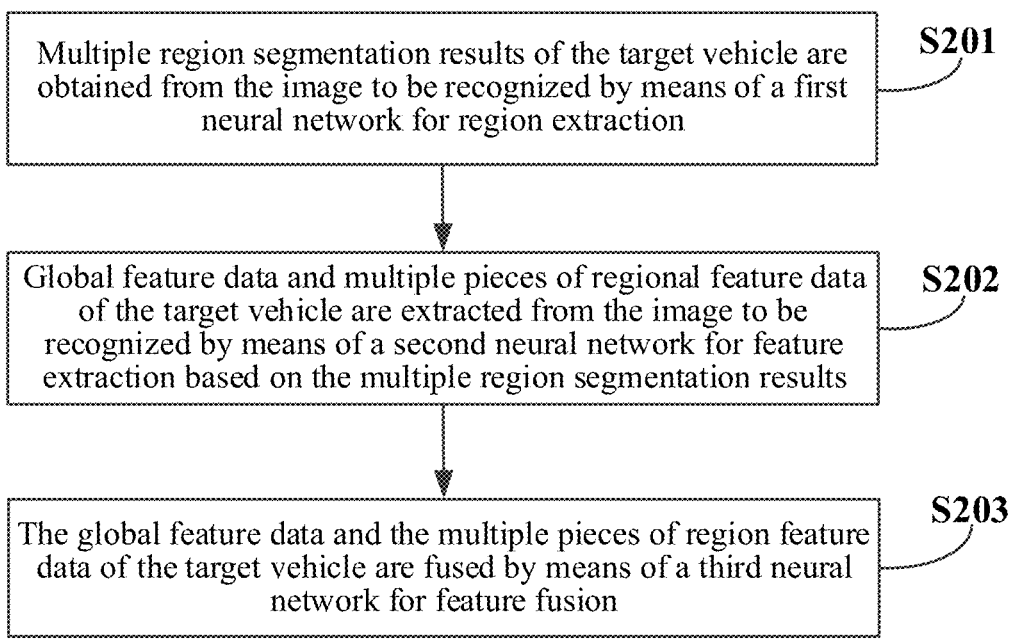
FIG. 2 is a flowchart of another embodiment of the method for vehicle appearance feature recognition according to the present disclosure.

FIG. 2 is a flowchart of another embodiment of the method for vehicle appearance feature recognition according to the present disclosure.

Referring to FIG. 2, at step S201, multiple region segmentation results of the target vehicle are obtained from the image to be recognized by means of a first neural network for region extraction.

In one embodiment, step S201 may be performed by a processor by invoking a corresponding instruction stored in a memory, and may also be performed by an obtaining sub-module 6011 run by the processor.

The first neural network may be any appropriate neural network that may implement region extraction or target object recognition, and may include, but not limited to, a convolutional neural network, an enhanced learning neural network, a generation network in an adversarial neural network, etc. The configuration of the structure in the neural network may be appropriately set by a person skilled in the art according to actual needs, such as the number of convolution layers, the size of the convolution kernel, the number of channels, etc., which is not limited in the embodiments of the present disclosure. In some embodiments of the present disclosure, the first neural network has a first feature extraction layer and a first computing layer connected to a tail end of the first feature extraction layer.

According to one or more embodiments of the present disclosure, step S201 includes: performing feature extraction on the image to be recognized by means of the first feature extraction layer to obtain multiple key points of the target vehicle; and classifying the multiple key points by means of the first computing layer to obtain multiple key point clusters, and respectively fusing feature maps of key points in the multiple key point clusters, to obtain region segmentation results corresponding to the multiple key point clusters.

Figure 3:
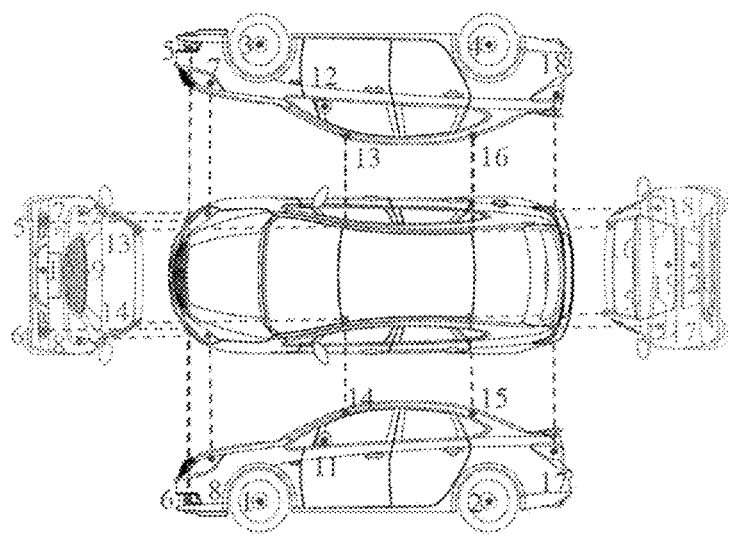
FIG. 3 is a schematic diagram showing distribution of vehicle key points for implementing the method embodiment of FIG. 2.

Since the vehicle is solid color and the chromatograms of some vehicles are quite similar, it is difficult to distinguish the vehicles according to the colors. In some embodiments extract the region features of the vehicle based on the vehicle key points. In this way, many detailed features of the vehicle may be better reflected from the region features. The vehicle key point in the embodiments is not the boundary point or corner point of the vehicle, but a significantly different position on the vehicle or a main component of the vehicle, such as a wheel, a lamp, a logo, a rearview mirror, a license plate, etc. FIG. 3 is a schematic diagram showing distribution of vehicle key points for implementing the method embodiment of FIG. 2. As shown in FIG. 3, the vehicle key points in the embodiments include a left front wheel 1, a left rear wheel 2, a right front wheel 3, a right rear wheel 4, a right fog-proof lamp 5, a left fog-proof lamp 6, a right front headlight 7, a left front headlight 8, a front car logo 9, a front license plate 10, a left rearview mirror 11, a right rearview mirror 12, a right front corner 13 of the roof, a left front corner 14 of the roof, a left rear corner of the roof 15, a right rear corner 16 of the roof, a left taillight 17, a right taillight 18, a rear car logo 19 and a rear license plate 20. In view of the above, the detailed features of the vehicle may be reflected from the region features, so as to describe the appearance of the vehicle more accurately.

Figure 4:
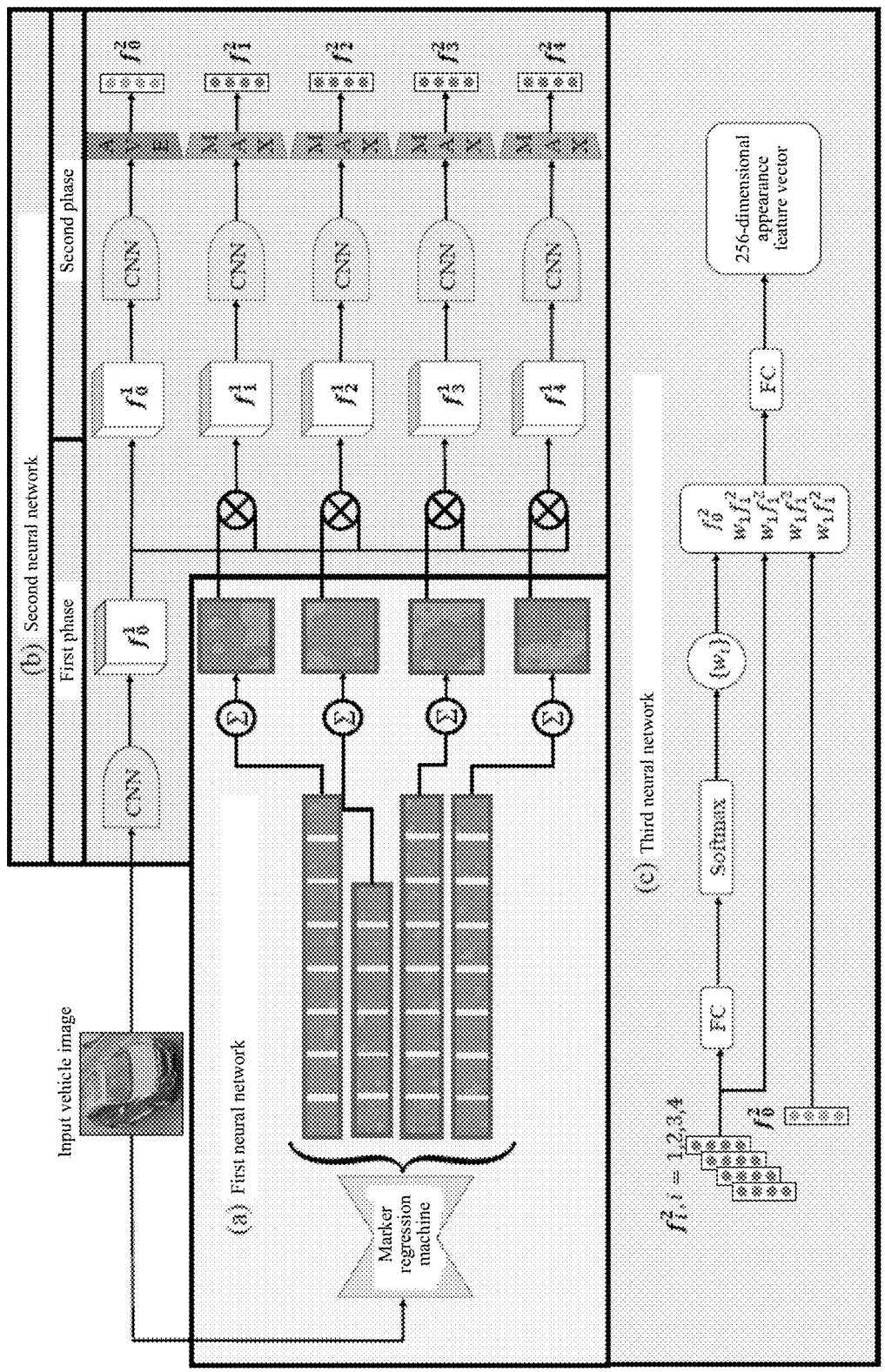
FIG. 4 is a schematic diagram of a network framework for implementing the method embodiment of FIG. 2.

In one or more embodiments, the first feature extraction layer performs feature extraction on the vehicle key points of the 20 vehicle key points in the input vehicle image to obtain a response feature map of the multiple vehicle key points. The first feature extraction layer may be an hourglass network structure. The first feature extraction layer needs to be trained before this step is executed. The training process of the first feature extraction layer may be: designing a target response feature map of the annotated vehicle key point as a Gaussian kernel around the annotated key point position, and then inputting a vehicle image containing the annotated vehicle key point into the first feature extraction layer; determining whether a prediction result of the first feature extraction layer is close to a target Gaussian kernel; and if the prediction result of the first feature extraction layer is not close to the target Gaussian kernel, adjusting parameters of the first feature extraction layer according to a difference between the prediction result and the target Gaussian kernel, and performing repeated iterative training. The prediction result of the first feature extraction layer for the annotated vehicle key point is a Gaussian kernel corresponding to the response feature map of the annotated vehicle key point, and the difference between the prediction result and the target Gaussian kernel may be a cross entropy. FIG. 4 is a schematic diagram of a network framework for implementing the method embodiment of FIG. 2. As shown in FIG. 4, a marker regression machine in the first neural network (a) is the representation of the first feature extraction layer.

In some embodiments, there are always some invisible regions of the vehicle in a vehicle image photographed at a particular angle. In order to deal with the problem of invisible vehicle key points, the geometric relationship between the vehicle key points may be fully utilized to allocate 20 vehicle key points into four clusters, for example, $C1=[5, 6, 7, 8, 9, 10, 13, 14]$, $C2=[15, 16, 17, 18, 19, 20]$, $C3=[1, 2, 6, 8, 11, 14, 15, 17]$, and $C4=[3, 4, 5, 7, 12, 13, 16, 18]$, the vehicle key points in the four clusters correspond to the front, rear, left and right sides of the vehicle, respectively, and then the feature maps of the key points in the multiple clusters are fused to obtain a front segmentation result, a rear segmentation result, a left segmentation result, and a right segmentation result of the vehicle, as shown in part (a) of FIG. 4.

Figure 5:
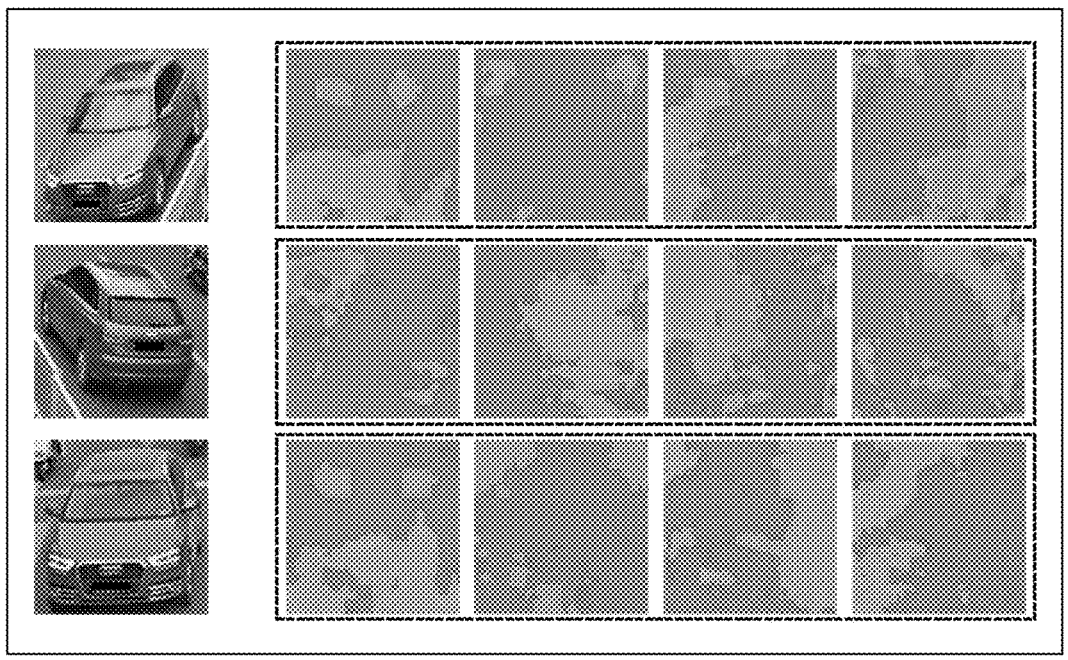
FIG. 5 is a schematic diagram showing a vehicle region segmentation result for implementing the method embodiment of FIG. 2.

FIG. 5 is a schematic diagram showing a vehicle region segmentation result for implementing the method embodiment of FIG. 2. As shown in FIG. 5, three vehicle images are sequentially arranged in the left side, and the front segmentation result, the rear segmentation result, the left segmentation result, and the right segmentation result of each vehicle image are sequentially arranged in the right side. As shown in the drawing, the segmentation result of the visible region of the vehicle in the vehicle image generally has a higher response than the segmentation result of the invisible region of the vehicle, which may indicate that the first feature extraction layer may not only predict the vehicle key points, but also may distinguish the visible vehicle key points from the invisible vehicle key points.

At step S202, global feature data and multiple pieces of region feature data of the target vehicle are extracted from the image to be recognized by means of a second neural network for feature extraction based on the multiple region segmentation results.

In one embodiment, step S202 may be performed by a processor by invoking a corresponding instruction stored in a memory, and may also be performed by an extraction sub-module 6021 run by the processor.

The second neural network may be any appropriate neural network that may implement region extraction or target object recognition, and may include, but not limited to, a convolutional neural network, an enhanced learning neural network, a generation network in an adversarial neural network, etc. The configuration of the optional structure in the neural network may be appropriately set by a person skilled in the art according to actual needs, such as the number of convolution layers, the size of the convolution kernel, the number of channels, etc., which is not limited in the embodiments of the present disclosure. In some embodiments, the second neural network has a first processing subnet and multiple second processing subnets separately connected to an output end of the first processing subnet, wherein the first processing subnet has a second feature extraction layer, a first inception module, and a first pooling layer, and the second processing subnet has a second computing layer, a second inception module, and a second pooling layer which are connected to the output end of the first processing subnet. The second feature extraction layer includes three convolution layers and two inception modules, and the inception module may perform convolution operations and pool operations.

According to one or more embodiments of the present disclosure, step S202 includes: performing a convolution operation and a pooling operation on the image to be recognized by means of the second feature extraction layer to obtain a global feature map of the target vehicle; performing a convolution operation and a pooling operation on the global feature map by means of the first inception module to obtain a first feature map set of the target vehicle; and performing a pooling operation on feature maps in the first feature map set by means of the first pooling layer to obtain a global feature vector of the target vehicle.

In some embodiments, the image to be recognized is first scaled, so that the size of the image to be recognized is 192*192, and then the scaled image is input to a second feature extraction layer composed of three convolution layers and two inception modules, and the second feature extraction layer performs a convolution operation and a pooling operation on the scaled image to obtain a global feature map having the space size of 12*12. Then, the first inception module performs a convolution operation and a pooling operation on the global feature map to obtain a set of feature maps having the space size of 6*6. Finally, the first pooling layer performs a global average pooling operation on the feature maps in the set, to obtain 1536-dimensional global feature vectors.

According to one or more embodiments of the present disclosure, step S202 may further include: performing point multiplication on the multiple region segmentation results and the global feature map separately by means of the second computing layer, to obtain local feature maps respectively corresponding to the multiple region segmentation results; performing a convolution operation and a pooling operation on the local feature maps of the multiple region segmentation results by means of the second inception module to obtain a second feature map set corresponding to the multiple region segmentation results; and performing a pooling operation on the second feature map set of the multiple region segmentation results by means of the second pooling layer to obtain first region feature vectors corresponding to the multiple region segmentation results.

According to one or more embodiments of the present disclosure, before the performing point multiplication on the multiple region segmentation results and the global feature map separately by means of the second computing layer, the method further includes: respectively scaling the multiple region segmentation results to the same size as a size of the global feature map by means of the second computing layer. In view of the above, it can be ensured that the dimension of the finally obtained region feature vector is the same as that of the global feature vector.

In some embodiments, the front segmentation result, the rear segmentation result, the left segmentation result, and the right segmentation result of the vehicle are first scaled to the same size as a size of the global feature map, i.e., the size of 12*12. Then, point multiplication is performed on the scaled front segmentation result, the rear segmentation result, the left segmentation result, and the right segmentation result and the global feature map respectively to obtain a front feature map, a rear feature map, a left feature map, and a right feature map of the vehicle. Then, the second inception module performs a convolution operation and a pooling operation on the front feature map, the rear feature map, the left feature map, and the right feature map of the vehicle, respectively, to obtain a feature map set separately corresponding to the local feature maps, and the space size of the feature maps in the feature map set is 6*6. Finally, the global maximum pooling operation is performed on the feature maps in the feature map set corresponding to multiple local feature maps by means of the second pooling layer, to obtain a front feature vector, a rear feature vector, a left feature vector, and a right feature vector of the vehicle. Moreover, the dimension of the feature vector of the local region is 1536 -dimension. The global maximum pooling operation is performed on the feature maps in the feature map set corresponding to the multiple local feature maps respectively, because the maximum response is more suitable for extracting features from a local region.

As shown in part (b) of FIG. 4, the second neural network is divided into two phases, and the global features and the local features are extracted in the form of trunk and branch. The first phase performs a convolution operation and a pooling operation on the image to be recognized to obtain a global feature map of the image to be recognized. The second phase consists of five branches, one global branch and four local region branches. The global branch performs the similar processing in the foregoing embodiments on the global feature map to obtain the global feature vector, and the local region branches respectively perform the similar processing in the foregoing embodiments on the specified region segmentation result in conjunction with the global feature map to obtain corresponding local feature vectors.

At step S203, the global feature data and the multiple pieces of region feature data of the target vehicle are fused by means of a third neural network for feature fusion.

In one embodiment step S203 may be performed by a processor by invoking a corresponding instruction stored in a memory, and may also be performed by a fusion sub-module 6031 run by the processor.

The third neural network may be any appropriate neural network that may implement feature fusion, and may include, but not limited to, a convolutional neural network, an enhanced learning neural network, a generation network in an adversarial neural network, etc. The configuration of the optional structure in the neural network may be appropriately set by a person skilled in the art according to actual needs, such as the number of convolution layers, the size of the convolution kernel, the number of channels, etc., which is not limited in the embodiments of the present disclosure. In some embodiments, the third neural network has a first fully connected layer, a third computing layer, and a second fully connected layer which are connected to an output end of the second neural network.

According to one or more embodiments of the present disclosure, step S203 includes: obtaining weight values of multiple first region feature vectors by means of the first fully connected layer; respectively weighting the multiple first region feature vectors by means of the third computing layer according to the weight values to obtain corresponding multiple second region feature vectors; and performing a mapping operation on the multiple second region feature vectors and the global feature vector by means of the second fully connected layer to obtain an appearance feature vector of the target vehicle.

According to one or more embodiments of the present disclosure, the obtaining weight values of multiple first region feature vectors by means of the first fully connected layer includes: performing a stitching operation on the multiple first region feature vectors to obtain a stitched first region feature vector; performing a mapping operation on the stitched first region feature vector by means of the first fully connected layer to obtain a set of scalars corresponding to the multiple first region feature vectors; and performing a normalization operation on the scalars in the set to obtain the weight values of the multiple first region feature vectors.

In some embodiments, the following operations are included.

A stitching operation is performed on the front feature vector, the rear feature vector, the left feature vector and the right feature vector of the vehicle, then the stitched front feature vector, rear feature vector, left feature vector and right feature vector are input into the first fully connected layer, and the first fully connected layer performs a mapping operation on the four feature vectors to obtain a scalar set.

A normalization operation is performed on scalars in the scalar set by means of the Softmax function to respectively obtain weight values of the front feature vector, the rear feature vector, the left feature vector, and the right feature vector.

The front feature vector, the rear feature vector, the left feature vector, and the right feature vector are respectively weighted according to the corresponding weight values, to obtain the weighted front feature vector, rear feature vector, left feature vector and right feature vector.

A stitching operation is performed on the weighted front feature vector, rear feature vector, left feature vector and right feature vector and the global feature vector.

The second fully connected layer performs a mapping operation on the stitched weighted local feature vector and the global feature vector to obtain a 256-dimensional vehicle appearance feature vector, as shown in part (c) of FIG. 4. In the process of feature fusion, the third neural network learns the weight values of the feature vectors of different vehicle regions. The features of different vehicle regions may have different importance. The features of the vehicle visible region in the vehicle image may be retained or given a greater weight. The features of the vehicle invisible region in the vehicle image may be eliminated or given a small weight in the competition process. For example, the orientation of the vehicle in the vehicle image is the left front, and the left and front sides of the vehicle may be seen. The features of the two sides are relatively important, and the weight values of the corresponding feature vectors are relatively larger, and the rear and right sides of the vehicle are invisible. Although the features of the two sides are also extracted, the weight values of the feature vectors of the two sides are relatively small. In this way, the vehicle key points in the vehicle visible region of the vehicle image contribute more to the final vehicle appearance feature vector, and the influence of the vehicle key points of the vehicle invisible region in the vehicle image on the final vehicle appearance feature vector is weakened by a relatively small weight value. In view of the above, the appearance of the vehicle may be described more accurately.

Figure 6:
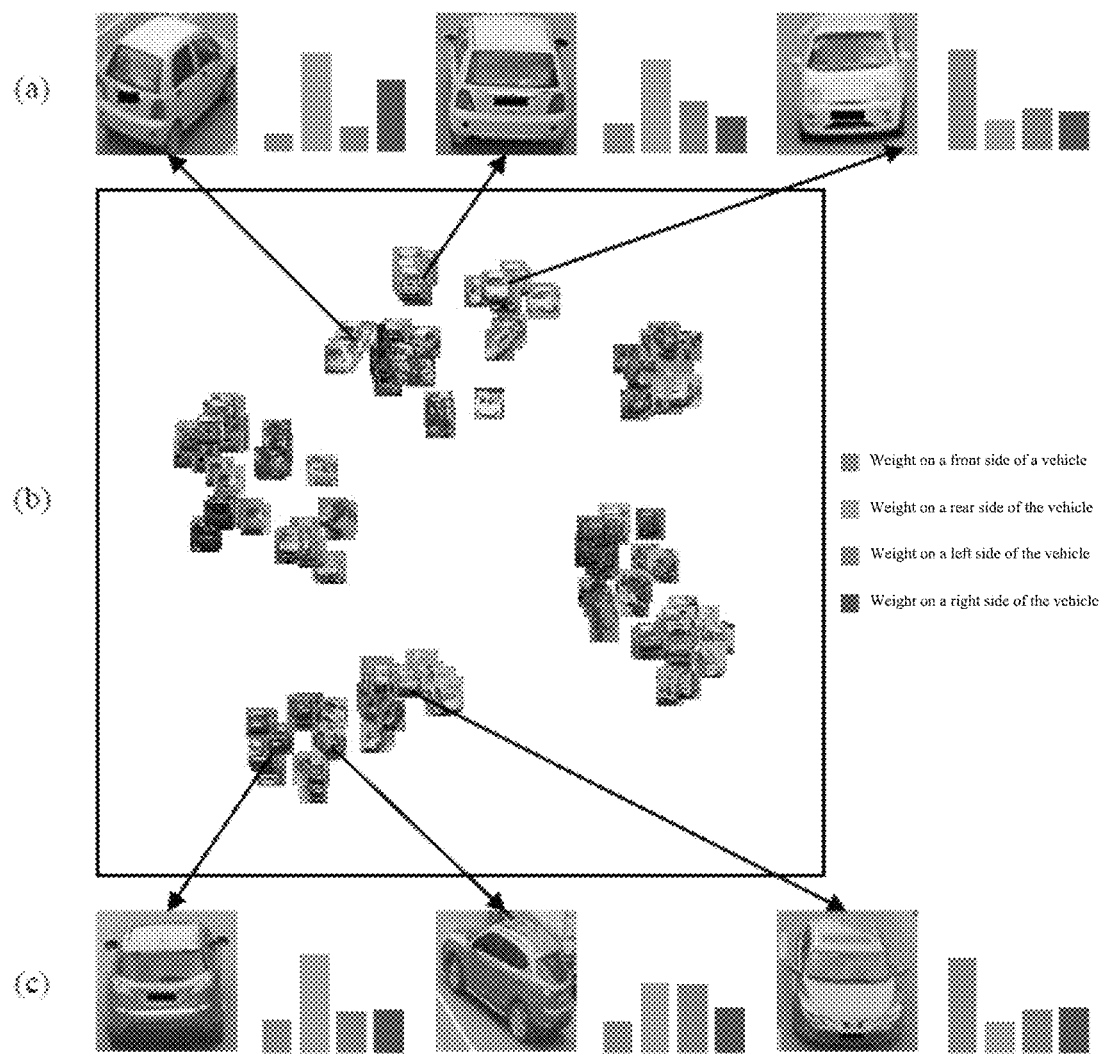
FIG. 6 is a schematic diagram showing a weight value of a vehicle region for implementing the method embodiment of FIG. 2.

FIG. 6 is a schematic diagram showing a weight value of a vehicle region for implementing the method embodiment of FIG. 2. As shown in FIG. 6, part (a) represents three images of different photographing angles of one vehicle input, and weight values of the front side, the rear side, the left side, and the right side of the vehicle in the image of each photographing angle, part (b) represents the projection result of the vehicle appearance feature of the selected vehicle image in the test set in the two-dimensional space, and part (c) represents three image of the different photographing angles of another vehicle input, and weight values of the front side, the rear side, the left side, and the right side of the vehicle in the image of each photographing angle. As can be seen from the drawing, the appearance features of the same vehicle may be aggregated regardless of the photographing angle of the vehicle image. Therefore, the appearance features of the vehicle recognized in the embodiments are independent of the photographing angle of the image to be recognized of the vehicle, and the vehicle appearance features in different vehicle images may be directly compared, and thus the problem that different regions between different vehicle images cannot be compared is solved. In addition, parts (a) and (c) of the drawing show the input vehicle image and the learning weights of the corresponding two clusters, and the local region features of the vehicle appearance are fused based on these learning weights. It can be observed that the weight value of the surface visible to the vehicle in the vehicle image is higher than the weight value of the surface invisible to the vehicle.

In addition, an alternative training strategy may be adopted to train the second neural network and the third neural network. The training strategy includes four steps. At step (i), a trunk network of the first phase of the second neural network and the global branch of the second phase may be trained from random initialization, and are supervised by means of global features of the whole image region. At step (ii), after the training of the trunk network of the first phase is completed, parameters of the global branch initialization of the second phase may be used to train the four local branches of the second phase, because the global branch of the second phase has the same structure as the local branches. In addition, the training of the four local branches is separately supervised by means of a given classification tag. At step (iii), after the training of the trunk network of the first phase and the branch of the second phase is completed, the third neural network is trained. At step (iv), a neural network having parameters learned by means of the foregoing steps is initialized, and the parameters are combined for fine tuning. Existing vehicle databases and Softmax classification loss may be used during training the second neural network and the third neural network.

In an optional disclosure, the vehicle appearance features recognized in the embodiments may be used to describe the vehicle, and may also be used to analyze the vehicle attributes, such as a coarse model, a subdivision model, and a vehicle color. In addition, the classification, recognition and retrieval of the vehicle are performed by using the vehicle appearance features recognized in the embodiments.

According to the method for vehicle appearance feature recognition in some embodiments, multiple region segmentation results of the target vehicle are obtained from the image to be recognized by means of a first neural network for region extraction, then global feature data and multiple pieces of region feature data of the target vehicle are extracted from the image to be recognized by means of a second neural network for feature extraction based on the multiple region segmentation results, and the global feature data and the multiple pieces of region feature data of the target vehicle are fused by means of a third neural network for feature fusion to obtain the appearance feature data of the target vehicle. Compared with the method for obtaining vehicle appearance features in the prior art, the method for vehicle appearance feature recognition in the embodiments recognizes the vehicle appearance features such as the global features, and features of local regions of the vehicle appearance, and reflects detail information of the target vehicle by means of the local region features, so as to describe the appearance of the vehicle more accurately. In addition, by means of the vehicle appearance features recognized in the embodiments, the vehicle appearance features in different vehicle images may be compared directly, thereby solving the problem that different regions between different vehicle images cannot be compared.

The method for vehicle appearance feature recognition in the embodiments may be executed by any appropriate device having data processing capability, including, but not limited to, a terminal device, a server and the like.

Figure 7:
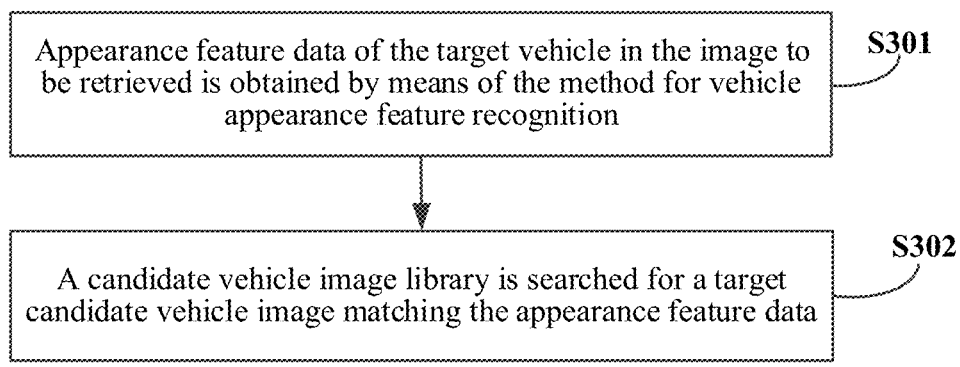
FIG. 7 is a flowchart of one embodiment of a method for vehicle retrieval according to the present disclosure.

FIG. 7 is a flowchart of one embodiment of a method for vehicle retrieval according to the present disclosure.

Referring to FIG. 7, at step S301, the appearance feature data of the target vehicle in the image to be retrieved is obtained by means of the method for vehicle appearance feature recognition.

In some embodiments, the appearance feature data of the target vehicle in the image to be retrieved may be obtained by the method for vehicle appearance feature recognition provided in Embodiment 1 or Embodiment 2. The appearance feature data may be data represented by a vector. In terms of the contents included in the image, the image to be recognized may be an image including a part of the target vehicle or an image including the whole target vehicle, etc. In terms of the category of the image, the image to be retrieved may be a photographed static image, or a video image in a video frame sequence, and may also be a synthetic image, etc.

In one embodiment, step S301 may be performed by a processor by invoking a corresponding instruction stored in a memory, and may also be performed by a second obtaining module 701 run by the processor.

At step S302, a candidate vehicle image library is searched for a target candidate vehicle image matching the appearance feature data.

In one embodiment, step S302 may be performed by a processor by invoking a corresponding instruction stored in a memory, and may also be performed by a searching module 702 run by the processor.

In some embodiments, the appearance feature data of vehicles in multiple vehicle images to be selected in the candidate vehicle image library may be obtained by means of the method for vehicle appearance feature recognition provided in Embodiment 1 or Embodiment 2, and the appearance feature data of the target vehicle is respectively compared with the appearance feature data of the vehicle in the vehicle image to be selected, to obtain a target candidate vehicle image matching the appearance feature data of the target vehicle.

Exemplary embodiments of the present disclosure are directed to provide a method for vehicle retrieval. Obtaining appearance feature data of a target vehicle in an image to be retrieved by means of the method for vehicle appearance feature recognition provided in Embodiment 1 or Embodiment 2, and searching the candidate vehicle image library for a target candidate vehicle image matching the appearance feature data may improve the accuracy of the vehicle retrieval.

The method for vehicle retrieval in the embodiments may be executed by any appropriate device having data processing capability, including, but not limited to, a terminal device, a server and the like.

Figure 8:
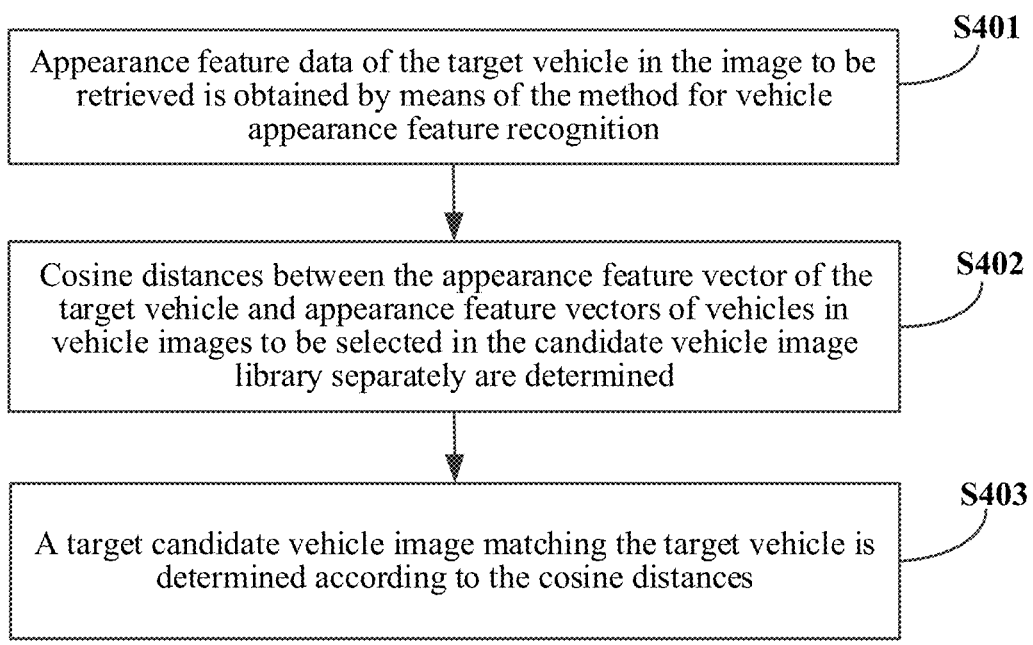
FIG. 8 is a flowchart of another embodiment of the method for vehicle retrieval according to the present disclosure.

FIG. 8 is a flowchart of another embodiment of the method for vehicle retrieval according to the present disclosure.

Referring to FIG. 8, at step S401, the appearance feature data of the target vehicle in the image to be retrieved is obtained by means of the method for vehicle appearance feature recognition.

In one optional example, step S401 may be performed by a processor by invoking a corresponding instruction stored in a memory, and may also be performed by a second obtaining module 804 run by the processor.

Since step S401 is the same as step S301, details are not described herein again.

At step S402, cosine distances between the appearance feature vector of the target vehicle and appearance feature vectors of vehicles in vehicle images to be selected in the candidate vehicle image library separately are determined.

In one embodiment, step S402 may be performed by a processor by invoking a corresponding instruction stored in a memory, and may also be performed by a searching module 805 run by the processor.

In some embodiments, a person skilled in the art may separately compute the cosine distances of the appearance feature vector of the target vehicle and the appearance feature vector of the vehicle in the vehicle image to be selected according to the existing cosine distance computational formula.

At step S403, a target candidate vehicle image matching the target vehicle is determined according to the cosine distances.

In one embodiment, step S403 may be performed by a processor by invoking a corresponding instruction stored in a memory, and may also be performed by a searching module 805 run by the processor.

In some embodiments, when the cosine distance between the appearance feature vector of the target vehicle and the appearance feature vector of the vehicle in the vehicle image to be selected is greater than or equal to a first preset threshold, the vehicle image to be selected is determined to be a target candidate vehicle image matching the target vehicle. A person skilled in the art may obtain the first preset threshold by means of tests. Certainly, the embodiments of the present disclosure are not limited thereto.

According to one or more embodiments of the present disclosure, the method further includes: obtaining the photographed time and/or a photographing position of the image to be retrieved and the photographed time and/or photographing positions of the multiple vehicle images to be selected; determining temporal-spatial distances between the target vehicle and vehicles in the multiple vehicle images to be selected according to the photographed time and/or the photographing positions; and determining, according to the cosine distances and the temporal-spatial distances, a target candidate vehicle image matching the target vehicle, in the candidate vehicle image library. Therefore, the accuracy of vehicle retrieval may be further improved.

According to one or more embodiments of the present disclosure, the determining, according to the cosine distances and the temporal-spatial distances, a target candidate vehicle image matching the target vehicle, in the candidate vehicle image library includes: obtaining the multiple vehicle images to be selected from the candidate vehicle image library according to the cosine distances; determining a temporal-spatial matching probability of the vehicle image to be selected and the target vehicle based on the photographed time and the photographing position of the vehicle image to be selected, respectively; and determining, according to the cosine distances and the temporal-spatial matching probability, a target candidate vehicle image matching the target vehicle.

The temporal-spatial information of the vehicle image may greatly enhance the recall rate of vehicle retrieval. If the photographing time and the photographing position of the to-be-retrieved vehicle image are known, the probability of occurrence of the vehicle in the vehicle image at another time and at another position may be obtained by statistical modeling. This is effective for retrieval tasks. The temporal-spatial matching probability is determined by the photographing time and the photographing positions of the vehicle image to be selected and the target vehicle image. In short, the temporal-spatial matching probability refers to a probability of occurrence of the target vehicle in the photographing time and the photographing position, which is obtained by statistical modeling according to the photographing time and the photographing position of the vehicle image. According to one or more embodiments of the present disclosure, the temporal-spatial matching probability refers to a conditional probability of a vehicle transfer interval between two cameras, which may be calculated by the following formula 1.

In practical disclosure scenarios, vehicle appearance features may not be sufficient to distinguish a vehicle from other vehicles, particularly if the vehicle has the same exterior without personalized decoration. However, in the monitoring disclosure, the photographing time and the photographing position of the vehicle image would easily be obtained. By analyzing the vehicle transfer interval between the two cameras, the inventors of the present disclosure find that for at least one pair of cameras, the vehicle transfer interval may be simulated as a random variable that satisfies the probability distribution. Due to the Gaussian-like and long-tailed properties of the vehicle transfer interval, lognormal distribution may be used to simulate the random variable. Given that l represents a camera indicating that the vehicle is leaving, and e represents a camera indicating that the vehicle enters, the conditional probability of the vehicle transfer interval $\tau$ between l and e is computed by means of the following formula 1:

$$p(\tau \mid l, e; \mu_{l,e}, \sigma_{l,e}) = \ln \mathcal{N}(\tau; \mu_{l,e}, \sigma_{l,e}) \qquad \text{Formula 1}$$

$$= \frac{1}{\tau \sigma_{l,e} \sqrt{2\pi}} \exp\left[-\frac{(\ln \tau - \mu_{l,e})^2}{2\sigma_{l,e}^2}\right]$$

wherein $\mu_{l,e}, \sigma_{l,e}$ respectively represent estimated parameters of each pair of cameras (l,e), and the vehicle transfer interval $\tau$ is an absolute value of the photographing time of two vehicle images, and the estimated parameters may be computed by maximizing the following log likelihood function:

$$L(\tau \mid l, e; \mu_{l,e}, \sigma_{l,e}) = \prod_{n=1}^{N}\left(\frac{1}{\tau_n}\right) \mathcal{N}(\ln \tau_n; \mu_{l,e}, \sigma_{l,e})$$

wherein $\tau_n \in \tau(n=1, 2, 3, \ldots, N)$ represents a vehicle transfer interval between two cameras of each pair of cameras (l, e) sampled from the training set, $\tau$ including the vehicle transfer interval samples between the two cameras in the training set.

After obtaining the conditional probability of the vehicle transfer interval $\tau$ between l and e, the temporal-spatial distance of vehicles between two vehicle images may be computed according to the following formula 2:

$$D_s = 1/(1 + e^{\alpha(p(\tau \mid l,e;\mu l, e, \sigma l, e) - 0.5)}) \qquad \text{Formula 2}$$

wherein the higher the conditional probability is, the smaller the temporal-spatial distance of vehicles between two vehicle images is.

Finally, the similarity distance between two vehicle images may be computed according to the following formula 3:

$$D = D_s + \beta D_s \qquad \text{Formula 3}$$

wherein Da represents the cosine distance of the vehicle appearance feature vector between two vehicle images, Ds represents the temporal-spatial distance between the two vehicle images, D represents the similarity distance of vehicles between the two vehicle images, the size of α is 2, the size of β is 0.1. A where the smaller the similarity distance of the vehicles between the two vehicle images is, the more similar the vehicles between the two vehicle images is.

When the similarity distance between the target vehicle and the vehicle in the vehicle image to be selected is less than or equal to a second preset threshold, it can be determined that the vehicle image to be selected is a target candidate vehicle image matching the target vehicle. A person skilled in the art may obtain the second preset threshold by means of tests. Certainly, the embodiments of the present disclosure are not limited thereto.

Figure 9:
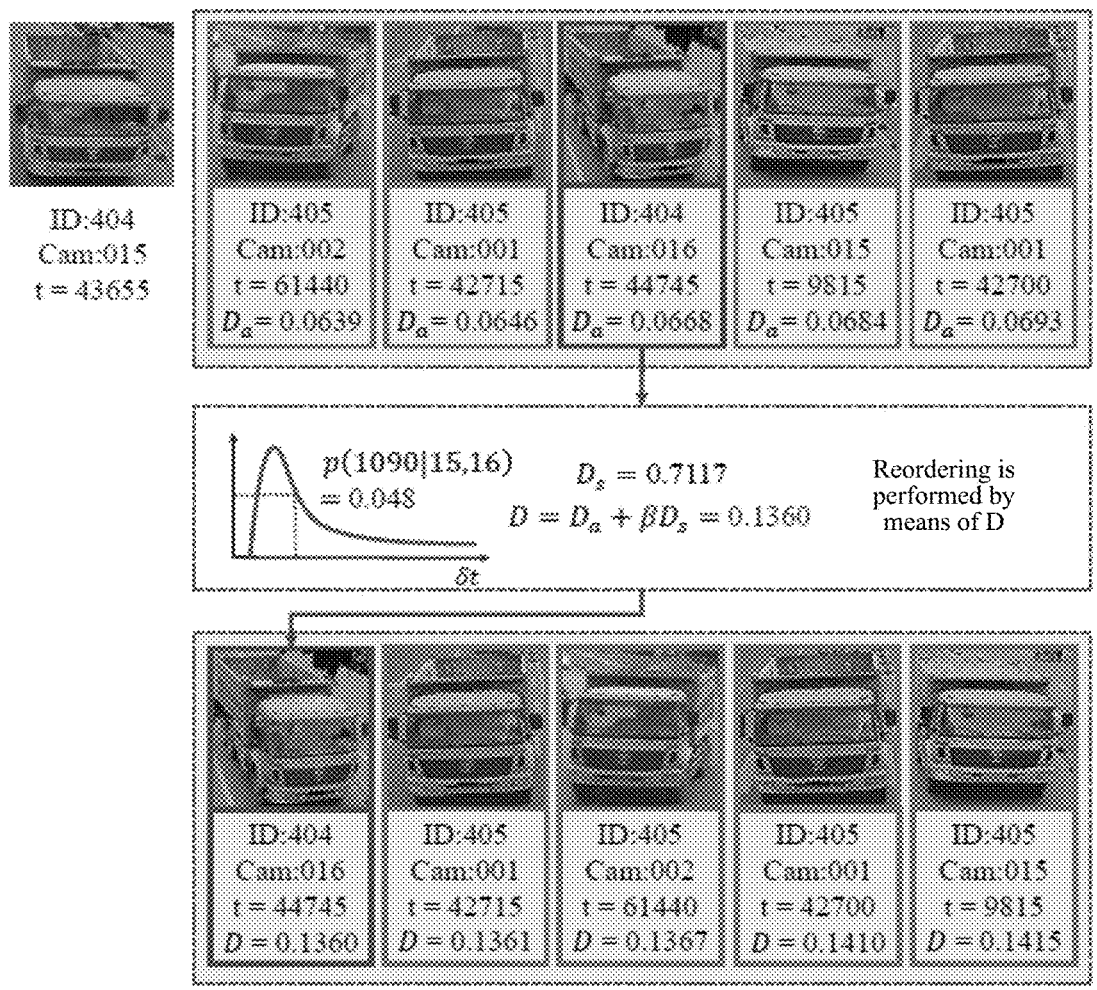
FIG. 9 is a schematic diagram showing a similarity distance of a vehicle for implementing the method embodiment of FIG. 8.

FIG. 9 is a schematic diagram showing a similarity distance of a vehicle for implementing the method embodiment of FIG. 8. As shown in FIG. 9, the images in the boxes in the first row are top five vehicle images to be selected obtained according to the cosine distance, and the leftmost image in the first row is the image of the target vehicle, and a row of images in the bottom row is a reordering result obtained based on the temporal-spatial distances of the vehicle image to be selected and the image of the target vehicle. According to one or more embodiments of the present disclosure, the conditional probability of the vehicle transfer interval is computed according to the photographing time values of the target vehicle image and the vehicle image to be selected and the serial numbers of the photographing cameras of the target vehicle image and the vehicle image to be selected by using formula 1. Then, the temporal-spatial distance between the target vehicle image and the vehicle image to be selected is computed according to the conditional probability of the vehicle transfer interval by using formula 2, and then the similarity distance of the vehicles between the target vehicle image and the vehicle image to be selected is computed according to the known cosine distance and the computed temporal-spatial distance by using formula 3. Finally, the sorting result of the vehicle image to be selected is reordered according to the similarity distance of the vehicles between the target vehicle image and the vehicle image to be selected, to obtain a reordering result of the to-be-selected vehicle image.

Exemplary embodiments of the present disclosure are directed to provide a method for vehicle retrieval. Obtaining appearance feature data of a target vehicle in an image to be retrieved by means of the method for vehicle appearance feature recognition provided in Embodiment 1 or Embodiment 2, and searching the candidate vehicle image library for a target candidate vehicle image matching the appearance feature data may improve the accuracy of the vehicle retrieval.

The method for vehicle retrieval in the embodiments may be executed by any appropriate device having data processing capability, including, but not limited to, a terminal device, a server and the like. Alternatively, any method provided by the embodiments of the present disclosure is executed by a processor, for example, any method mentioned in the embodiments of the present disclosure is executed by the processor by invoking a corresponding instruction stored in a memory. Details are not described below again.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as Read-Only Memory (ROM), Random Access Memory (RAM), a magnetic disk, or an optical disk.

Figure 10:
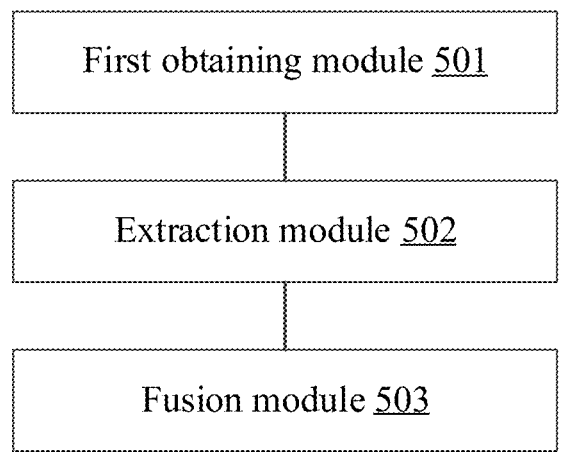
FIG. 10 is a schematic structural diagram of one embodiment of an apparatus for vehicle appearance feature recognition according to the present disclosure.

Based on the same technical concept, FIG. 10 is a schematic structural diagram of one embodiment of an apparatus for vehicle appearance feature recognition according to the present disclosure. The apparatus may be used to execute the procedures of the method for vehicle appearance feature recognition according to Embodiment 1.

Referring to FIG. 10, the apparatus for vehicle appearance feature recognition includes a first obtaining module 501, an extraction module 502, and a fusion module 503.

The first obtaining module 501 is configured to obtain multiple region segmentation results of a target vehicle from an image to be recognized.

The extraction module 502 is configured to extract global feature data and multiple pieces of region feature data from the image to be recognized based on the multiple region segmentation results.

The fusion module 503 is configured to fuse the global feature data and the multiple pieces of region feature data to obtain appearance feature data of the target vehicle.

By means of the apparatus for vehicle appearance feature recognition provided by the embodiments, multiple region segmentation results of a target vehicle are obtained from an image to be recognized including the target vehicle, then global feature data and multiple pieces of region feature data are extracted from the image to be recognized based on the multiple region segmentation results, and the global feature data and the multiple pieces of region feature data are fused to obtain appearance feature data of the target vehicle. The vehicle appearance features recognized by the embodiments include features of the local regions of the vehicle appearance, so as to describe the appearance of the vehicle more accurately. In addition, by means of the vehicle appearance features recognized in the embodiments, the vehicle appearance features in different vehicle images may be compared directly, thereby solving the problem that different regions between different vehicle images cannot be compared.

Figure 11:
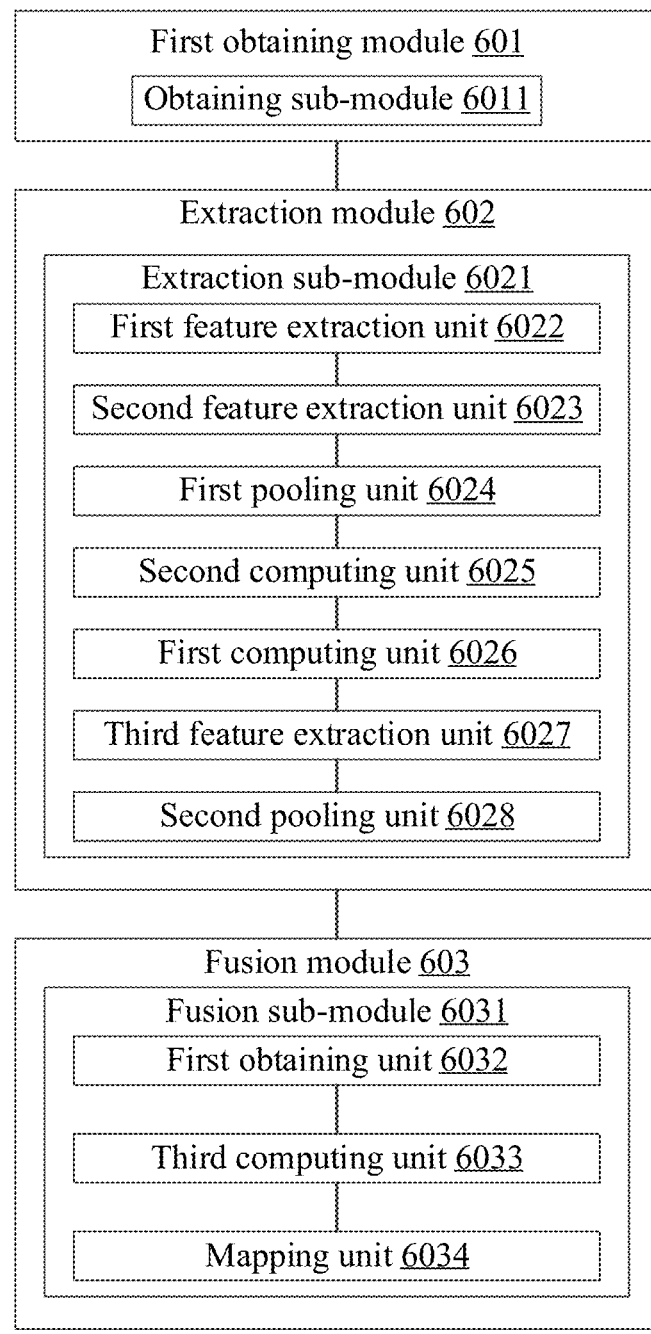
FIG. 11 is a schematic structural diagram of another embodiment of the apparatus for vehicle appearance feature recognition according to the present disclosure.

Based on the same technical concept, FIG. 11 is a schematic structural diagram of another embodiment of the apparatus for vehicle appearance feature recognition according to the present disclosure. The apparatus may be used to execute the procedures of the method for vehicle appearance feature recognition according to Embodiment 2.

Referring to FIG. 11, the apparatus for vehicle appearance feature recognition includes a first obtaining module 601, an extraction module 602, and a fusion module 603. The first obtaining module 601 is configured to obtain multiple region segmentation results of a target vehicle from an image to be recognized. The extraction module 602 is configured to extract global feature data and multiple pieces of region feature data from the image to be recognized based on the multiple region segmentation results. The fusion module 603 is configured to fuse the global feature data and the multiple pieces of region feature data to obtain appearance feature data of the target vehicle.

According to one or more embodiments of the present disclosure, multiple region segmentation results respectively correspond to regions of different orientations of the target vehicle.

According to one or more embodiments of the present disclosure, the multiple region segmentation results include segmentation results of a front side, a rear side, a left side, and a right side of the target vehicle.

According to one or more embodiments of the present disclosure, the first obtaining module 601 includes: an obtaining sub-module 6011, configured to obtain multiple region segmentation results of the target vehicle from the image to be recognized by means of a first neural network for region extraction.

According to one or more embodiments of the present disclosure, the first neural network has a first feature extraction layer and a first computing layer connected to a tail end of the first feature extraction layer, wherein the obtaining sub-module 6011 is configured to: perform feature extraction on the image to be recognized by means of the first feature extraction layer to obtain multiple key points of the target vehicle; and the multiple key points are classified by means of the first computing layer to obtain multiple key point clusters, and respectively fuse feature maps of key points in the multiple key point clusters, to obtain region segmentation results corresponding to the multiple key point clusters.

According to one or more embodiments of the present disclosure, the extraction module 602 includes: an extraction sub-module 6021, configured to extract global feature data and multiple pieces of region feature data of the target vehicle from the image to be recognized by means of a second neural network for feature extraction based on the multiple region segmentation results.

According to one or more embodiments of the present disclosure, the second neural network has a first processing subnet and multiple second processing subnets separately connected to an output end of the first processing subnet, wherein the first processing subnet has a second feature extraction layer, a first inception module, and a first pooling layer, and the second processing subnet has a second computing layer, a second inception module, and a second pooling layer which are connected to the output end of the first processing subnet.

According to one or more embodiments of the present disclosure, the extraction sub-module 6021 includes: a first feature extraction unit 6022, configured to perform a convolution operation and a pooling operation on the image to be recognized by means of the second feature extraction layer to obtain a global feature map of the target vehicle; a second feature extraction unit 6023, configured to perform a convolution operation and a pooling operation on the global feature map by means of the first inception module to obtain a first feature map set of the target vehicle; and a first pooling unit 6024, configured to perform a pooling operation on feature maps in the first feature map set by means of the first pooling layer to obtain a global feature vector of the target vehicle.

According to one or more embodiments of the present disclosure, the extraction sub-module 6021 further includes: a first computing unit 6026, configured to perform point multiplication on the multiple region segmentation results and the global feature map separately by means of the second computing layer, to obtain local feature maps respectively corresponding to the multiple region segmentation results; a third feature extraction unit 6027, configured to perform a convolution operation and a pooling operation on the local feature maps of the multiple region segmentation results by means of the second inception module to obtain a second feature map set corresponding to the multiple region segmentation results; and a second pooling unit 6028, configured to perform a pooling operation on the second feature map set of the multiple region segmentation results by means of the second pooling layer to obtain first region feature vectors corresponding to the multiple region segmentation results.

According to one or more embodiments of the present disclosure, the extraction sub-module 6021 further includes: a second computing unit 6025, configured to respectively scale the multiple region segmentation results to the same size as a size of the global feature map by means of the second computing layer.

According to one or more embodiments of the present disclosure, the fusion module 603 includes: a fusion sub-module 6031, configured to fuse the global feature data and the multiple pieces of region feature data of the target vehicle by means of a third neural network for feature fusion.

According to one or more embodiments of the present disclosure, the third neural network has a first fully connected layer, a third computing layer, and a second fully connected layer which are connected to an output end of the second neural network, wherein the fusion sub-module 6031 includes: a first obtaining unit 6032, configured to obtain weight values of the first region feature vectors by means of the first fully connected layer; a third computing unit 6033, configured to respectively weight the multiple first region feature vectors by means of the third computing layer according to the weight values to obtain corresponding multiple second region feature vectors; and mapping unit 6034, configured to perform a mapping operation on the multiple second region feature vectors and the global feature vector by means of the second fully connected layer to obtain an appearance feature vector of the target vehicle.

According to one or more embodiments of the present disclosure, the first obtaining unit 6032 is configured to: perform a stitching operation on the multiple first region feature vectors to obtain a stitched first region feature vector; perform a mapping operation on the stitched first region feature vector by means of the first fully connected layer to obtain a set of scalars corresponding to the multiple first region feature vectors; and perform a normalization operation on the multiple scalars in the set to obtain the weight values of the multiple first region feature vectors.

According to one or more embodiments of the present disclosure, the first feature extraction layer is an hourglass network structure.

It should be noted that the specific details further involved in the apparatus for vehicle appearance feature recognition provided by the embodiments of the present disclosure have been described in detail in the method for vehicle appearance feature recognition provided by the embodiments of the present disclosure, and are not described herein again.

Figure 12:
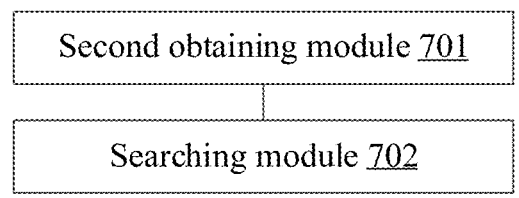
FIG. 12 is a schematic structural diagram of one embodiment of an apparatus for vehicle retrieval according to the present disclosure.

Based on the same technical concept, FIG. 12 is a schematic structural diagram of one embodiment of an apparatus for vehicle retrieval according to the present disclosure. The apparatus may be used to execute the procedures of the method for vehicle retrieval according to Embodiment 3.

Referring to FIG. 12, the apparatus for vehicle retrieval includes a second obtaining module 701 and a searching module 702.

The second obtaining module 701 is configured to obtain appearance feature data of a target vehicle in an image to be retrieved by means of the apparatus according to Embodiment 5 or Embodiment 6.

The searching module 702 is configured to search a candidate vehicle image library for a target candidate vehicle image matching the appearance feature data.

Exemplary embodiments of the present disclosure are directed to provide an apparatus for vehicle retrieval. Obtaining appearance feature data of a target vehicle in an image to be retrieved by means of the apparatus for vehicle appearance feature recognition provided in Embodiment 5 or Embodiment 6, and searching the candidate vehicle image library for a target candidate vehicle image matching the appearance feature data may improve the accuracy of the vehicle retrieval.

Figure 13:
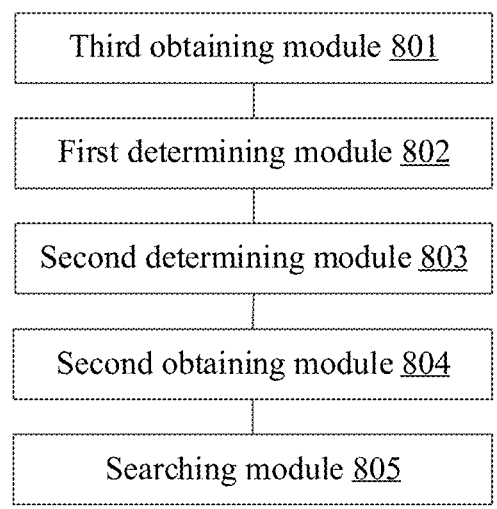
FIG. 13 is a schematic structural diagram of another embodiment of the apparatus for vehicle retrieval according to the present disclosure.

Based on the same technical concept, FIG. 13 is a schematic structural diagram of another embodiment of the apparatus for vehicle retrieval according to the present disclosure. The apparatus may be used to execute the procedures of the method for vehicle retrieval according to Embodiment 4.

Referring to FIG. 13, the apparatus for vehicle retrieval includes a second obtaining module 804 and a searching module 805. The second obtaining module 804 is configured to obtain appearance feature data of a target vehicle in an image to be retrieved by means of the apparatus according to Embodiment 5 or Embodiment 6. The searching module 805 is configured to search a candidate vehicle image library for a target candidate vehicle image matching the appearance feature data.

According to one or more embodiments of the present disclosure, the searching module 805 is configured to: determine cosine distances between the appearance feature vector of the target vehicle and appearance feature vectors of vehicles in vehicle images to be selected in the candidate vehicle image library, separately; and determine, according to the cosine distances, a target candidate vehicle image matching the target vehicle.

According to one or more embodiments of the present disclosure, the apparatus in the embodiments further includes: a third obtaining module 801, configured to obtain the photographed time and/or a photographing position of the image to be retrieved and the photographed time and/or photographing positions of the multiple vehicle images to be selected; a first determining module 802, configured to determine temporal-spatial distances between the target vehicle and vehicles in the multiple vehicle images to be selected according to the photographed time and/or the photographing positions; and a second determining module 803, configured to determine, according to the cosine distances and the temporal-spatial distances, a target candidate vehicle image matching the target vehicle, in the candidate vehicle image library.

According to one or more embodiments of the present disclosure, the second determining module 803 is configured to: obtain the multiple vehicle images to be selected from the candidate vehicle image library according to the cosine distances; determine a temporal-spatial matching probability of the vehicle image to be selected and the target vehicle based on the photographed time and the photographing position of the vehicle image to be selected, respectively; and determine, according to the cosine distances and the temporal-spatial matching probability, a target candidate vehicle image matching the target vehicle.

It should be noted that the specific details further involved in the apparatus for vehicle retrieval provided by the embodiments of the present disclosure have been described in detail in the method for vehicle retrieval provided by the embodiments of the present disclosure, and are not described herein again.

Figure 14:
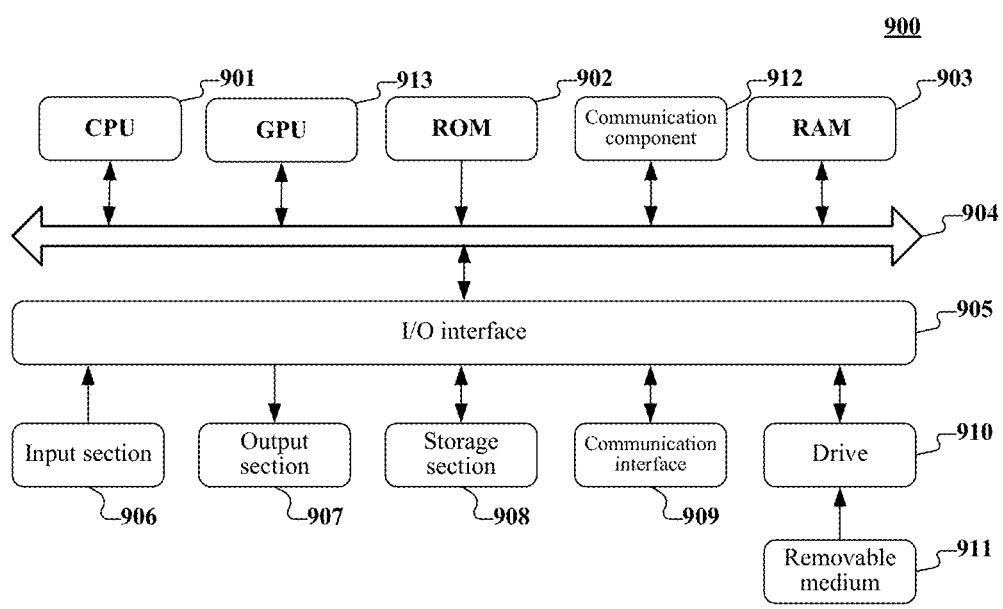
FIG. 14 is a schematic structural diagram of one embodiment of an electronic device applicable to realize a terminal device or a server according to the embodiments of the present disclosure.

The embodiments of the present disclosure further provide an electronic device which, for example, may be a mobile terminal, a PC, a tablet computer, a server, and the like. Referring to FIG. 14 below, a schematic structural diagram of one embodiment of an electronic device 900, which may be a terminal device or a server, suitable for implementing the embodiments of the present disclosure is shown. As shown in FIG. 14, the electronic device 900 includes one or more first processors, a first communication element, and the like. The one or more first processors are, for example, one or more Central Processing Units (CPUs) 901 and/or one or more Graphic Processing Units (GPUs) 913 and the like, and may execute appropriate actions and processing according to executable instructions stored in a Read-Only Memory (ROM) 902 or executable instructions loaded from a storage section 908 to a Random Access Memory (RAM) 903. In some embodiments, the ROM 902 and the RAM 903 are collectively called a first memory. The first communication element includes a communication component 912 and/or a communication interface 909. The communication component 912 may include, but is not limited to, a network card. The network card may include, but is not limited to, an InfiniBand (IB) network card. The communication interface 909 includes a communication interface of a network interface card such as an LAN card and a modem, and the communication interface 909 performs communication processing via a network such as the Internet.

The first processor may be in communication with the ROM 902 and/or the RAM 903 to execute the executable instruction, is connected to the communication component 912 by means of the first communication bus 904, and is in communication with other target devices by means of the communication component 912, so as to complete operations corresponding to any method for vehicle appearance feature recognition provided by some embodiments of the present disclosure. For example, multiple region segmentation results of a target vehicle are obtained from an image to be recognized, global feature data and multiple pieces of region feature data are extracted from the image to be recognized based on the multiple region segmentation results, and the global feature data and the multiple pieces of region feature data are fused to obtain appearance feature data of the target vehicle.

In addition, the RAM 903 may further store various programs and data required for operations of an apparatus. The CPU 901 or GPU 913, the ROM 902, and the RAM 903 are connected to each other by means of the first communication bus 904. In the presence of the RAM 903, the ROM 902 is an optional module. The RAM 903 stores executable instructions, or writes the executable instructions to the ROM 902 during running, wherein the executable instructions enable the first processor to perform corresponding operations of the foregoing communication method. An Input/output (I/O) interface 905 is also connected to the first communication bus 904. The communication component 912 may be integrated, and may be configured to have a plurality of sub-modules (for example, a plurality of IB network cards) linked on the communication bus.

The following components are connected to the I/O interface 905: an input section 906 including a keyboard, a mouse and the like; an output section 907 including a Cathode-Ray Tube (CRT), a Liquid Crystal Display (LCD), a loudspeaker and the like; a storage section 908 including hardware and the like; and the communication interface 909 of a network interface card including an LAN card, a modem and the like. A drive 910 is also connected to the I/O interface 905 according to requirements. A removable medium 911 such as a magnetic disk, an optical disk, a magneto-optical disk, a semiconductor memory or the like is mounted on the drive 910 according to requirements, so that a computer program read from the removable medium is installed on the storage section 908 according to requirements. It should be noted that the architecture illustrated in FIG. 14 is merely an optional implementation. During optional practice, the number and types of the components in FIG. 14 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the steps of the methods provided by the embodiments of the present disclosure. For example, multiple region segmentation results of a target vehicle are obtained from an image to be recognized, global feature data and multiple pieces of region feature data are extracted from the image to be recognized based on the multiple region segmentation results, and the global feature data and the multiple pieces of region feature data are fused to obtain appearance feature data of the target vehicle. In such embodiments, the computer program may be downloaded from a network by means of the communication element and installed, and/or be installed from the removable medium 911. When the computer program is executed by the first processor, functions provided in the method according to the embodiments of the present disclosure are executed.

Figure 15:
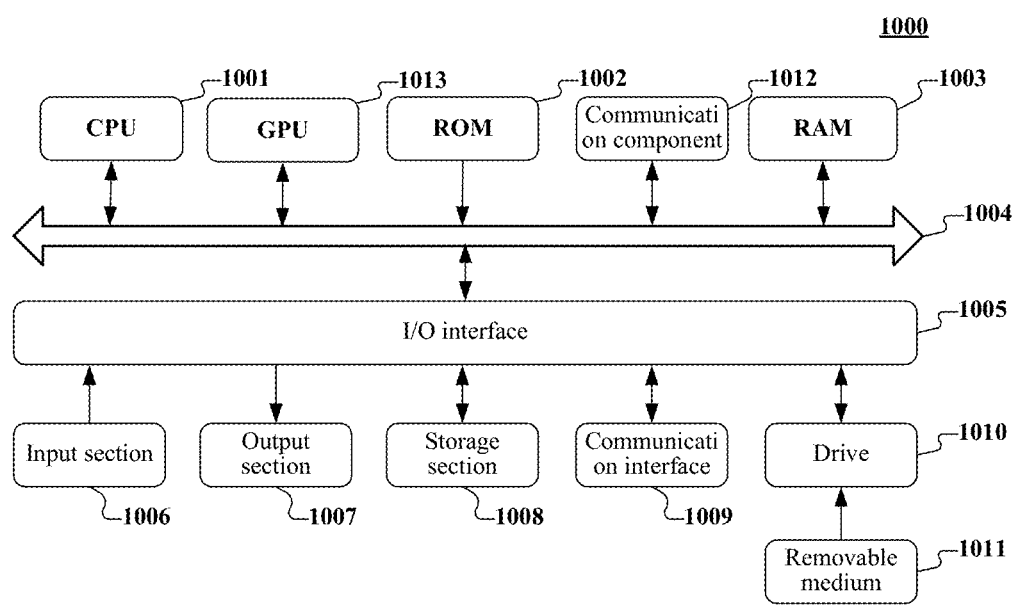
FIG. 15 is a schematic structural diagram of another embodiment of the electronic device applicable to realize the terminal device or the server according to the embodiments of the present disclosure.

The embodiments of the present disclosure further provide an electronic device which, for example, may be a mobile terminal, a PC, a tablet computer, a server, and the like. Referring to FIG. 15 below, a schematic structural diagram of another embodiment of an electronic device 1000, which may be a terminal device or a server, suitable for implementing the embodiments of the present disclosure is shown. As shown in FIG. 15, the electronic device 1000 includes one or more second processors, a second communication element, and the like. The one or more second processors are, for example, one or more CPUs 1001 and/or one or more GPUs 1013 and the like, and may execute appropriate actions and processing according to executable instructions stored in an ROM 1002 or executable instructions loaded from a storage section 1008 to an RAM 1003. In the embodiments, the second ROM 1002 and the RAM 1003 are collectively called a second memory. The second communication element includes a communication component 1012 and/or a communication interface 1009. The communication component 1012 may include, but is not limited to, a network card. The network card may include, but is not limited to, an IB network card. The communication interface 1009 includes a communication interface of a network interface card such as an LAN card and a modem, and the communication interface 1009 performs communication processing via a network such as the Internet.

The second processor may be in communication with the ROM 1002 and/or the RAM 1003 to execute the executable instruction, is connected to the communication component 1012 by means of the second communication bus 1004, and is in communication with other target devices by means of the communication component 1012, so as to complete operations corresponding to any method for vehicle retrieval provided by the embodiments of the present disclosure. For example, appearance feature data of the target image in the image to be retrieved is obtained by means of the method according to Embodiment 1 or Embodiment 2, and a candidate vehicle image library is searched for the target candidate vehicle image matching the appearance feature data.

In addition, the RAM 1003 may further store various programs and data required for operations of an apparatus. The CPU 1001 or GPU 1013, the ROM 1002, and the RAM 1003 are connected to each other by means of the second communication bus 1004. In the presence of the RAM 1003, the ROM 1002 is an optional module. The RAM 1003 stores executable instructions, or writes the executable instructions to the ROM 1002 during running, wherein the executable instructions enable the second processor to perform corresponding operations of the foregoing communication method. An I/O interface 1005 is also connected to the second communication bus 1004. The communication component 1012 may be integrated, and may also be configured to have a plurality of sub-modules (for example, a plurality of IB network cards) linked on the communication bus. The following components are connected to the I/O interface 1005: an input section 1006 including a keyboard, a mouse and the like; an output section 1007 including a Cathode-Ray Tube (CRT), a Liquid Crystal Display (LCD), a loudspeaker and the like; a storage section 1008 including hardware and the like; and the communication interface 1009 of a network interface card including an LAN card, a modem and the like. A drive 1010 is also connected to the I/O interface 1005 according to requirements. A removable medium 1011 such as a magnetic disk, an optical disk, a magneto-optical disk, a semiconductor memory or the like is mounted on the drive 1010 according to requirements, so that a computer program read from the removable medium is installed on the storage section 1008 according to requirements.

It should be noted that the architecture illustrated in FIG. 15 is merely an optional implementation. During optional practice, the number and types of the components in FIG. 15 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the steps of the methods provided by the embodiments of the present disclosure. For example, appearance feature data of the target image in the image to be retrieved is obtained by means of the method according to Embodiment 1 or Embodiment 2, and a candidate vehicle image library is searched for the target candidate vehicle image matching the appearance feature data. In such embodiments, the computer program may be downloaded from a network by means of the communication element and installed, and/or be installed from the removable medium 1011. When the computer program is executed by the second processor, functions provided in the method according to the embodiments of the present disclosure are executed.

It should be noted that according to needs for implementation, the components/steps described in the present disclosure are separated into more components/steps, and two or more components/steps or some operations of the components/steps are also combined into new components/steps.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure .Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual disclosure of the present disclosure, and to make a person of ordinary skill in the art understand the present disclosure, so as to design various embodiments with various modifications applicable to particular use.

The invention claimed is:

1. A method for vehicle appearance feature recognition, comprising:
    obtaining a plurality of region segmentation results of a target vehicle from an image to be recognized;
    extracting global feature data and a plurality of pieces of region feature data from the image to be recognized based on the plurality of region segmentation results; and
    fusing the global feature data and the plurality of pieces of region feature data to obtain appearance feature data of the target vehicle,
    wherein the obtaining a plurality of region segmentation results of a target vehicle from an image to be recognized comprises:
    obtaining the plurality of region segmentation results of the target vehicle from the image to be recognized by means of a first neural network for region extraction,
    wherein the first neural network has a first feature extraction layer and a first computing layer connected to a tail end of the first feature extraction layer,
    wherein the obtaining a plurality of region segmentation results of the target vehicle from the image to be recognized by means of a first neural network for region extraction comprises:
    performing feature extraction on the image to be recognized by means of the first feature extraction layer to obtain a plurality of key points of the target vehicle; and
    classifying the plurality of key points by means of the first computing layer to obtain a plurality of key point clusters, and respectively fusing feature maps of key points in the plurality of key point clusters, to obtain region segmentation results corresponding to the plurality of key point clusters.

2. The method according to claim 1, wherein the plurality of region segmentation results respectively corresponds to regions of different orientations of the target vehicle,
    wherein the plurality of region segmentation results comprise segmentation results of a front side, a rear side, a left side, and a right side of the target vehicle.

3. The method according to claim 1, wherein the extracting global feature data and a plurality of pieces of region feature data from the image to be recognized based on the plurality of region segmentation results comprises:
    extracting global feature data and the plurality of pieces of region feature data of the target vehicle from the image to be recognized by means of a second neural network for feature extraction based on the plurality of region segmentation results.

4. The method according to claim 3, wherein the second neural network has a first processing subnet and a plurality of second processing subnets separately connected to an output end of the first processing subnet,
    wherein the first processing subnet has a second feature extraction layer, a first inception module, and a first pooling layer, and the second processing subnet has a second computing layer, a second inception module, and a second pooling layer which are connected to the output end of the first processing subnet.

5. The method according to claim 4, wherein the extracting global feature data and a plurality of pieces of region feature data of the target vehicle from the image to be recognized by means of a second neural network for feature extraction based on the plurality of region segmentation results comprises:
    performing a convolution operation and a pooling operation on the image to be recognized by means of the second feature extraction layer to obtain a global feature map of the target vehicle;
    performing a convolution operation and a pooling operation on the global feature map by means of the first inception module to obtain a first feature map set of the target vehicle; and
    performing a pooling operation on feature maps in the first feature map set by means of the first pooling layer to obtain a global feature vector of the target vehicle.

6. The method according to claim 5, wherein the extracting global feature data and a plurality of pieces of region feature data of the target vehicle from the image to be recognized by means of a second neural network for feature extraction based on the plurality of region segmentation results further comprises:
    performing point multiplication on the plurality of region segmentation results and the global feature map separately by means of the second computing layer, to obtain local feature maps respectively corresponding to the plurality of region segmentation results;

performing a convolution operation and a pooling operation on the local feature maps of the plurality of region segmentation results by means of the second inception module to obtain a second feature map set corresponding to the plurality of region segmentation results; and performing a pooling operation on the second feature map set of the plurality of region segmentation results by means of the second pooling layer to obtain first region feature vectors corresponding to the plurality of region segmentation results.

7. The method according to claim 6, wherein before the performing point multiplication on the plurality of region segmentation results and the global feature map separately by means of the second computing layer, the method further comprises:

respectively scaling the plurality of region segmentation results to the same size as a size the global feature map by means of the second computing layer.

8. The method according to claim 1, wherein the fusing the global feature data and the plurality of pieces of region feature data comprises:

fusing the global feature data and the plurality of pieces of region feature data of the target vehicle by means of a third neural network for feature fusion.

9. The method according to claim 8, wherein the third neural network has a first fully connected layer, a third computing layer, and a second fully connected layer which are connected to an output end of the second neural network, wherein the fusing the global feature data and the plurality of pieces of region feature data of the target vehicle by means of a third neural network for feature fusion comprises:

obtaining weight values of the first region feature vectors by means of the first fully connected layer;

respectively weighting the plurality of first region feature vectors by means of the third computing layer according to the weight values to obtain corresponding a plurality of second region feature vectors; and performing a mapping operation on the plurality of second region feature vectors and the global feature vector by means of the second fully connected layer to obtain an appearance feature vector of the target vehicle.

10. The method according to claim 9, wherein the obtaining weight values of the first region feature vectors by means of the first fully connected layer comprises:

performing a stitching operation on the plurality of first region feature vectors to obtain a stitched first region feature vector;

performing a mapping operation on the stitched first region feature vector by means of the first fully connected layer to obtain a set of scalars corresponding to the plurality of first region feature vectors; and performing a normalization operation on the scalars in the set to obtain the weight values of the plurality of first region feature vectors.

11. The method according to claim 1, wherein the first feature extraction layer is an hourglass network structure.

12. A method for vehicle retrieval, comprising:

obtaining appearance feature data of a target vehicle in an image to be retrieved by means of the method according to claim 1; and searching a candidate vehicle image library for a target candidate vehicle image matching the appearance feature data.

13. The method according to claim 12, wherein the searching a candidate vehicle image library for a target candidate vehicle image matching the appearance feature data comprises:

determining cosine distances between the appearance feature vector of the target vehicle and appearance feature vectors of vehicles in vehicle images to be selected in the candidate vehicle image library, separately; and determining, according to the cosine distances, a target candidate vehicle image matching the target vehicle.

14. The method according to claim 13, further comprising:

obtaining a photographed time and/or a photographing position of the image to be retrieved and the photographed time and/or photographing positions of the plurality of vehicle images to be selected;

determining temporal-spatial distances between the target vehicle and vehicles in the plurality of vehicle images to be selected according to the photographed time and/or the photographing positions; and determining, according to the cosine distances and the temporal-spatial distances, a target candidate vehicle image matching the target vehicle, in the candidate vehicle image library.

15. The method according to claim 14, wherein the determining, according to the cosine distances and the temporal-spatial distances, a target candidate vehicle image matching the target vehicle, in the candidate vehicle image library comprises:

obtaining the plurality of vehicle images to be selected from the candidate vehicle image library according to the cosine distances;

determining a temporal-spatial matching probability of the vehicle image to be selected and the target vehicle based on the photographed time and the photographing position of the vehicle image to be selected, respectively; and determining, according to the cosine distances and the temporal-spatial matching probability, a target candidate vehicle image matching the target vehicle.

16. An apparatus for vehicle retrieval, comprising:

a memory storing processor-executable instructions; and a processor arranged to execute the stored processor-executable instructions to perform steps of:

obtaining appearance feature data of a target vehicle in an image to be retrieved by means of the method according to claim 1; and searching a candidate vehicle image library for a target candidate vehicle image matching the appearance feature data.

17. An apparatus for vehicle appearance feature recognition, comprising:

a memory storing processor-executable instructions; and a processor arranged to execute the stored processor-executable instructions to perform steps of:

obtaining a plurality of region segmentation results of a target vehicle from an image to be recognized;

extracting global feature data and a plurality of pieces of region feature data from the image to be recognized based on the plurality of region segmentation results; and fusing the global feature data and the plurality of pieces of region feature data to obtain appearance feature data of the target vehicle, wherein the obtaining a plurality of region segmentation results of a target vehicle from an image to be recognized comprises:
obtaining the plurality of region segmentation results of the target vehicle from the image to be recognized by means of a first neural network for region extraction,
wherein the first neural network has a first feature extraction layer and a first computing layer connected to a tail end of the first feature extraction layer,
wherein the obtaining a plurality of region segmentation results of the target vehicle from the image to be recognized by means of a first neural network for region extraction comprises:
performing feature extraction on the image to be recognized by means of the first feature extraction layer to obtain a plurality of key points of the target vehicle; and
classifying the plurality of key points by means of the first computing layer to obtain a plurality of key point clusters, and respectively fusing feature maps of key points in the plurality of key point clusters, to obtain region segmentation results corresponding to the plurality of key point clusters.

18. The apparatus according to claim 17, wherein the plurality of region segmentation results respectively corresponds to regions of different orientations of the target vehicle,
wherein the plurality of region segmentation results comprise segmentation results of a front side, a rear side, a left side, and a right side of the target vehicle.

19. A non-transitory computer readable storage medium having stored thereon computer program instructions that, when executed by a processor, cause the processor to implement steps of a method for vehicle appearance feature recognition, the method comprising:
obtaining a plurality of region segmentation results of a target vehicle from an image to be recognized;
extracting global feature data and a plurality of pieces of region feature data from the image to be recognized based on the plurality of region segmentation results; and fusing the global feature data and the plurality of pieces of region feature data to obtain appearance feature data of the target vehicle,
wherein the obtaining a plurality of region segmentation results of a target vehicle from an image to be recognized comprises:
obtaining the plurality of region segmentation results of the target vehicle from the image to be recognized by means of a first neural network for region extraction,
wherein the first neural network has a first feature extraction layer and a first computing layer connected to a tail end of the first feature extraction layer,
wherein the obtaining a plurality of region segmentation results of the target vehicle from the image to be recognized by means of a first neural network for region extraction comprises:
performing feature extraction on the image to be recognize by means of the first feature extraction layer to obtain a plurality of key points of the target vehicle, and classifying the plurality of key points by means of the first computing layer to obtain a plurality of key point clusters, and respectively fusing feature maps of key points in the plurality of key point clusters, to obtain region segmentation results corresponding to the plurality of key point clusters.

* * * * *